July 3, 1956  D. K. JOVANOVICH  2,753,004
PITCH CONTROL MEANS FOR AIRCRAFT SUSTAINING ROTORS
Filed March 15, 1952  5 Sheets-Sheet 1
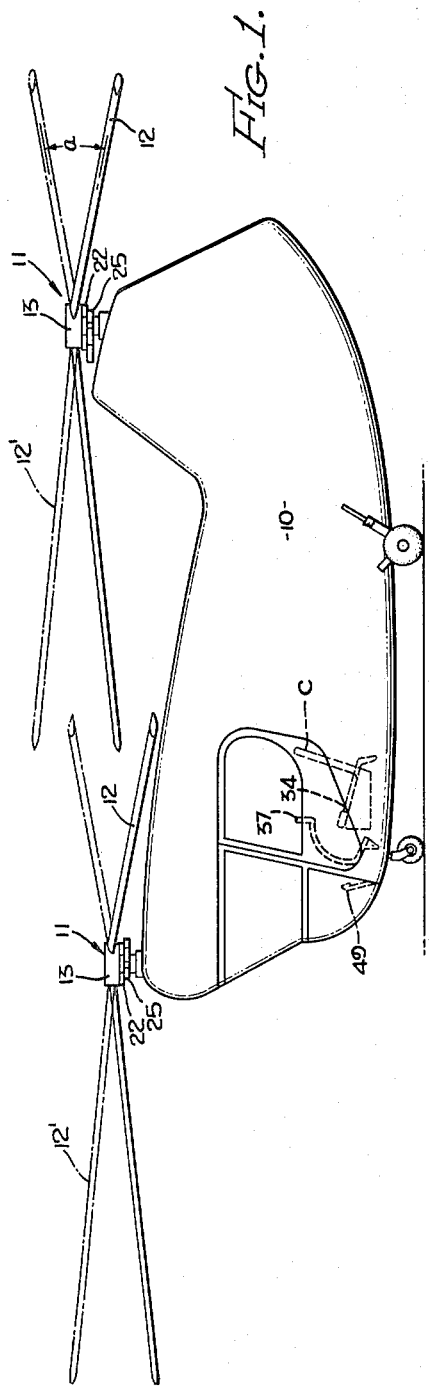
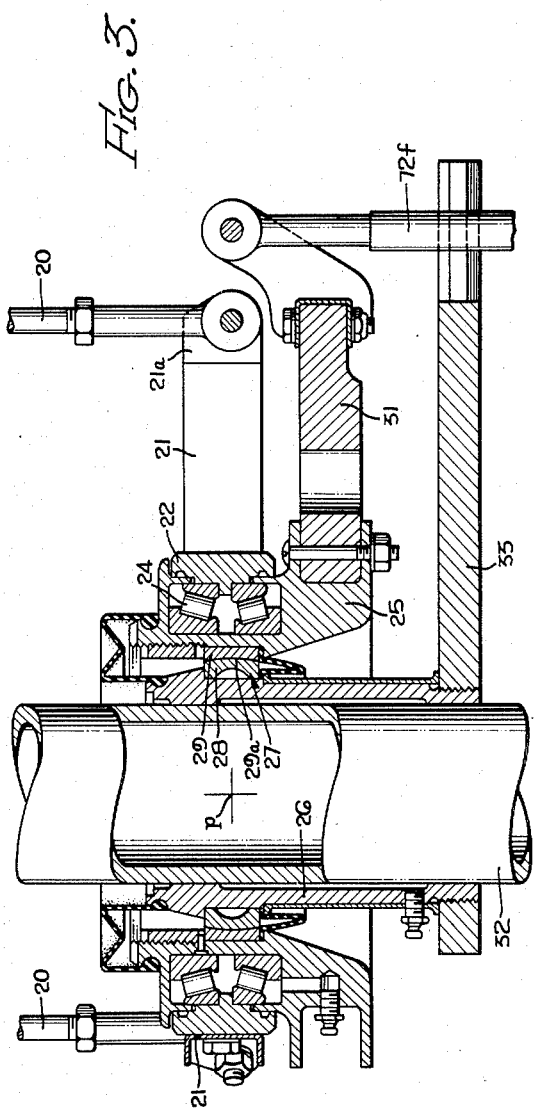
DRAGOLJUB K. JOVANOVICH,
INVENTOR.
BY
ATTORNEY July 3, 1956  D. K. JOVANOVICH  2,753,004
PITCH CONTROL MEANS FOR AIRCRAFT SUSTAINING ROTORS
Filed March 15, 1952  5 Sheets-Sheet 2

DRAGOLJUB K. JOVANOVICH,
INVENTOR.

BY
ATTORNEY

July 3, 1956 D. K. JOVANOVICH 2,753,004
PITCH CONTROL MEANS FOR AIRCRAFT SUSTAINING ROTORS
Filed March 15, 1952 5 Sheets-Sheet 3
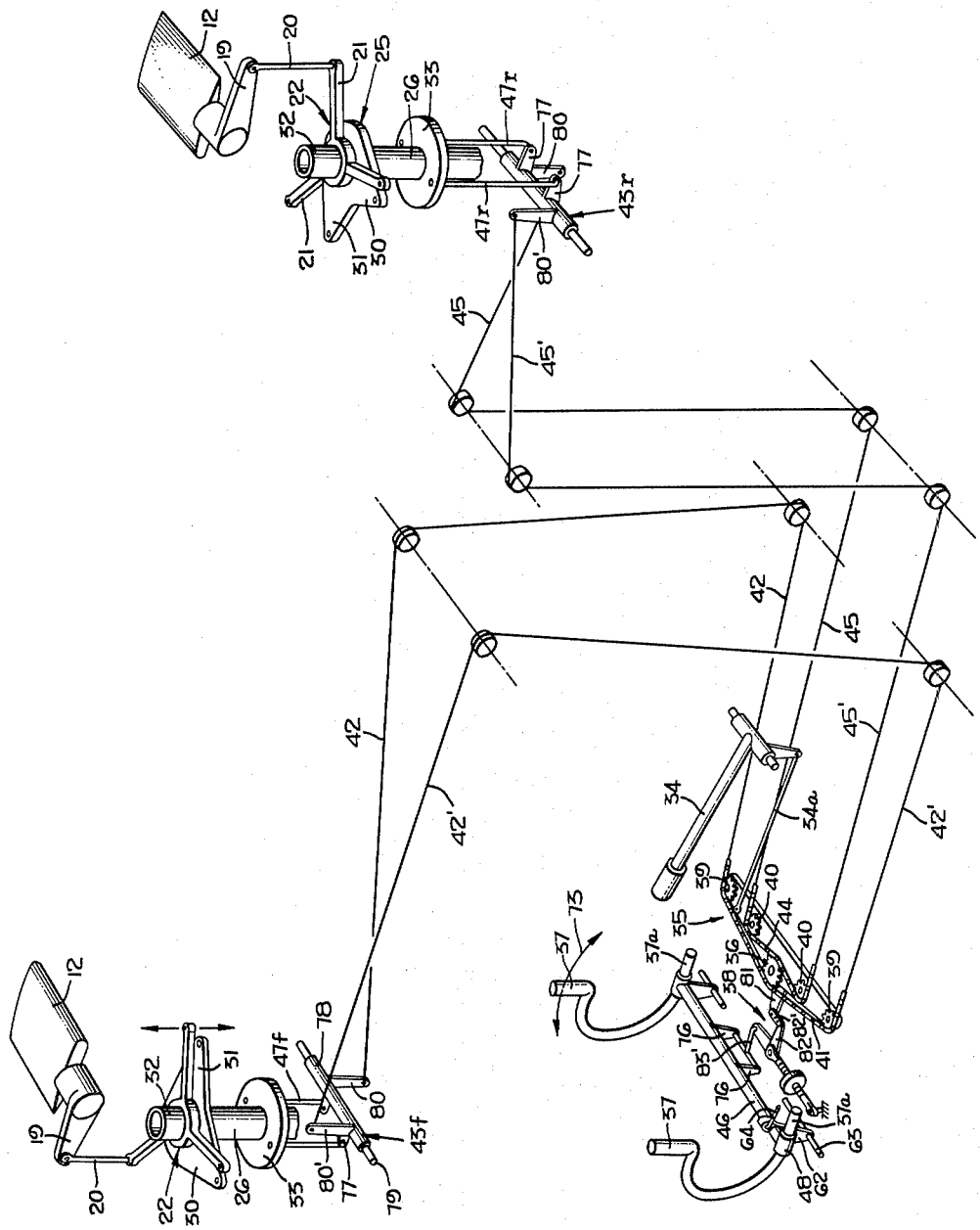
Fig. 4.
DRAGOLJUB K. JOVANOVICH,
INVENTOR.
BY 
ATTORNEY

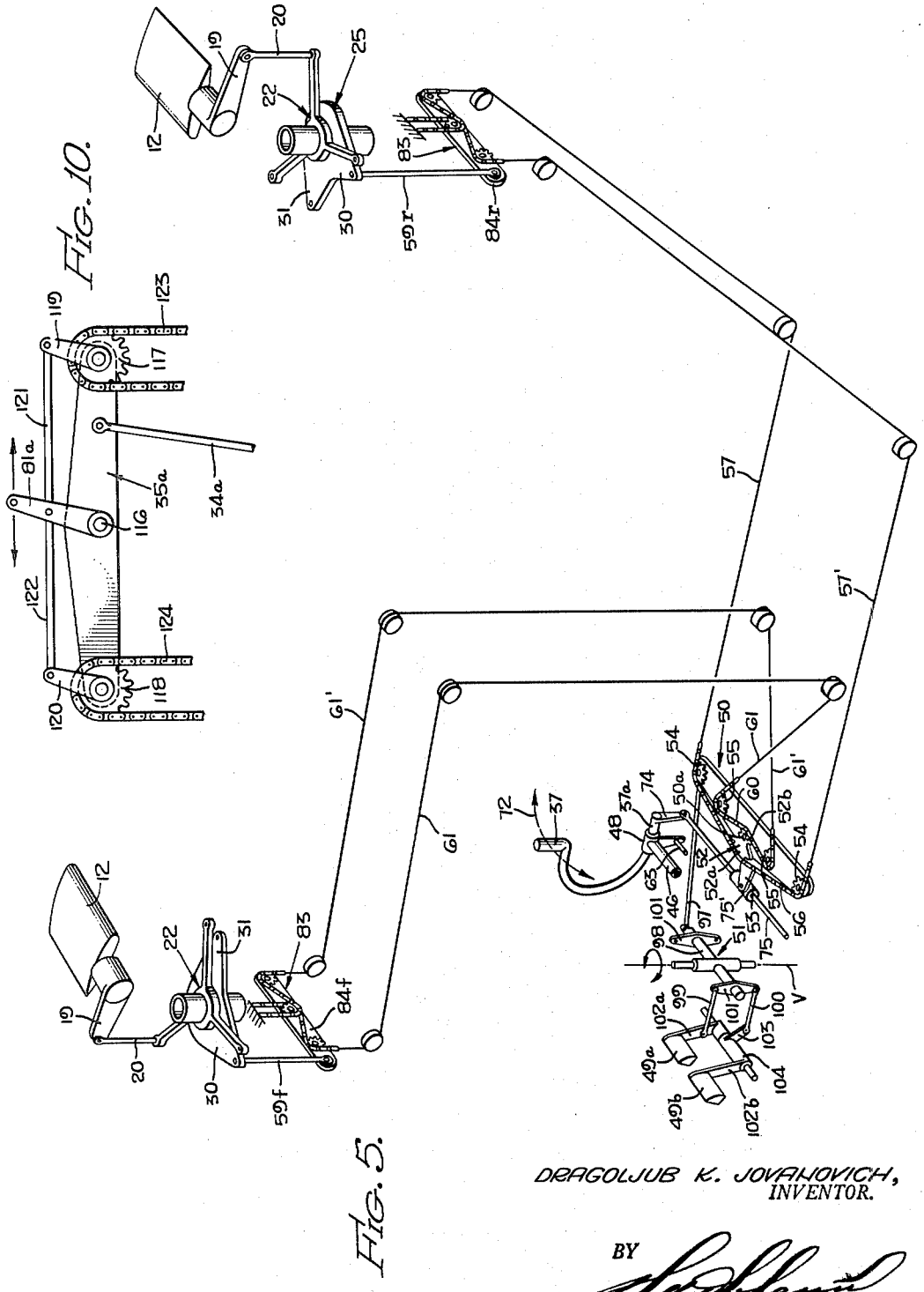

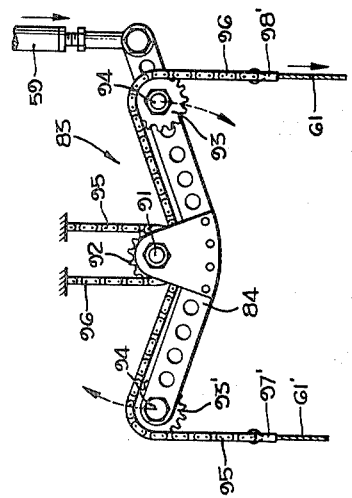

United States Patent Office 2,753,004
Patented July 3, 1956

2,753,004

PITCH CONTROL MEANS FOR AIRCRAFT SUSTAINING ROTORS

Dragoljub K. Jovanovich, Redondo Beach, Calif., assignor to McCulloch Motors Corporation, Los Angeles, Calif., a corporation of Wisconsin Application March 15, 1952, Serial No. 276,786

28 Claims. (Cl. 170—135.24)

This invention relates to aircraft of the type having lifting and sustaining means consisting of blades which are rotated around substantially vertical axis, such as helicopters and autogyros, for example.

It is an object of the invention to provide simple means for varying the pitch angles of the rotor blades, and it is a further object of the invention to provide a simple control means whereby the pitch angles of the blades are varied simultaneously or collectively and to provide a simple means whereby the control of the pitch of the blade is cyclic, thereby giving a greater blade rise on one side of the circle of rotation of the blades than on the other, whereby the blades are given a horizontal force component which will effect sideward, rearward or forward movements of the craft.

It is an object of the invention to provide a simple means for effecting collective change in the pitch of the rotor blades so that all of the blades will have substantially the same lift and revolve in a manner to define an upwardly expanding cone around a vertical axis and thereby produce vertical lift without lateral components tending to shift horizontally the part of the craft fuselage supported by the rotor. The invention is especially adapted for use in tandem rotor helicopters having front and rear rotors which rotate around their respective vertical axis in opposite directions.

A further object of the invention is to provide a control for a rotor supported craft of tandem type having a fuselage with a vertically expanded tail section, this control means being adapted to simultaneously vary the cyclic pitch on both the front and rear rotors so that the front and rear ends of the craft will both move laterally in the same direction, this control means being arranged so that the rear rotor is automatically adjusted so as to have a lateral force component slightly in excess of the lateral force component of the front rotor, to compensate for the additional drag of the tail portion of the fuselage, the result being that the craft is shifted laterally substantially without rotation around a vertical axis.

A further object of the invention is to provide a simple control for a tandem type of rotor supported aircraft wherein the front and rear rotors are adjusted in cyclic pitch so that their force components will act laterally in opposite directions, thereby causing the craft to rotate around a vertical axis, it being a feature of this simple control that the parts thereof are so arranged that the rear rotor will be adjusted so as to have a greater lateral force component than the front rotor, thereby producing rotation of the craft around a vertical axis situated near the front end thereof, and preferably substantially at the station defined by the pilot's chair so that the lateral steering action of the craft results in a rotation of the pilot around a vertical axis near to or passing through him, without appreciable lateral transitory movement.

A further object of the invention is to produce a simple control for tandem type rotor supported aircraft which will effect greater stability in forward and rearward movement of the craft. This control means is characterized by arrangement of its parts so that when the rotors are adjusted in cyclic pitch for forward movement, the cyclic pitch adjustment of the forward rotor will be slightly greater than that of the rearward rotor, thereby causing the forward rotor to have a pulling action on the front of the craft, greater than the horizontal force exerted upon the craft by the rearward rotor, whereby a straight ahead forward movement of the craft will be effected without any appreciable rotation of the craft around a vertical axis, referred to as yawing. Similarly, when the controls are actuated for reverse movement of the craft, the control means will effect adjustment of the rear rotor blades in cyclic pitch so that the rearward force component of the rear rotor will be greater than that of the front rotor, thereby stabilizing the craft in its rearward movement, also.

A further object of the invention is to provide a control system for a sustaining rotor and a spider rotatable on the swash plate, this spider and also the swash plate having link connectors all disposed in the transverse plane which passes through the center of tilting movement of the swash plate.

A further object of the invention is to provide a simple means for foot pedeal adjustment and for correlation of control effects by use of a simple mixing lever arrangement.

Further objects and advantages of the invention may be brought out in the following part of the specification wherein a preferred embodiment of the invention has been prescribed in extended detail for the purpose of completeness of disclosure without limiting the scope of the invention set forth in the appended claims.

Referring to the drawings which are for illustrative purposes only:

Fig. 1 is a side view of an aircraft having sustaining rotors and control means therefor embodying the invention;

Fig. 3 is an enlarged fragmentary sectional view showing a portion of the rotor shaft and the blade pitch control mechanism;

Fig. 4 is a schematic view showing the collective and differential controls for the front and rear rotors. Herein certain mechanical parts are merely shown diagrammatically for the reason that the physical form thereof may be in accordance with known engineering practices;

Fig. 5 is a schematic view in perspective of the lateral and directional controls for the front and rear rotors;

Fig. 6 is a schematic elevational view showing the longitudinal cyclic pitch controls for the front and rear rotors;

Fig. 7 is a fragmentary sectional view of the forward levers supporting sleeve which cooperates with the sleeve of the front pitch control mechanism;

Figure 9:
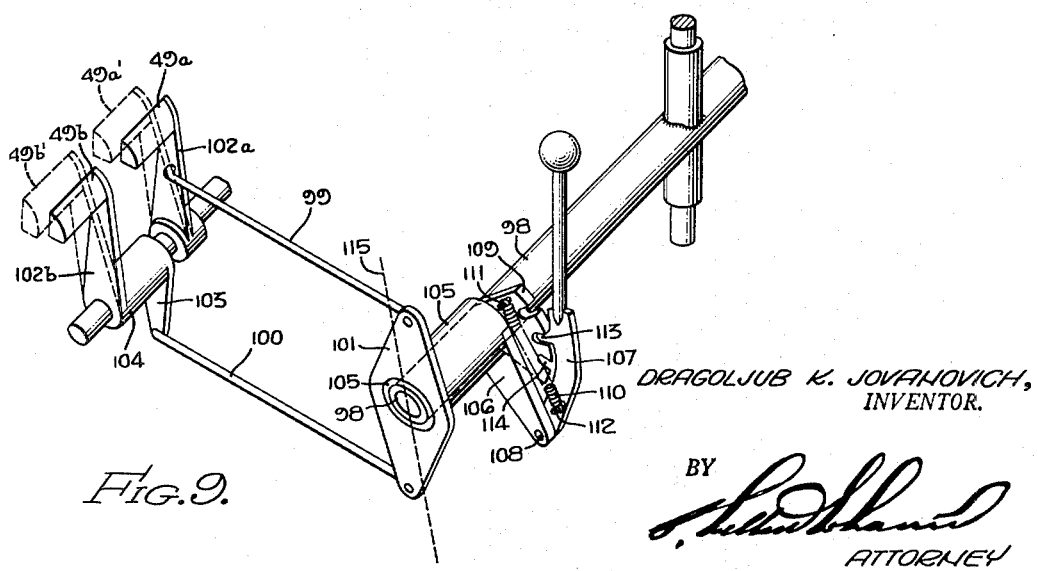

Fig. 8 an elevational view taken from the position indicated by the line 8—8 of Fig. 7;

Fig. 9 is a fragmentary schematic view showing the simplified means for simultaneously adjusting a pair of foot pedals toward and away from the pilot;

Fig. 10 is a schematic plan view of an alternative form of mixing lever.

The helicopter shown in Fig. 1 has a body or shell 10 having sustaining impellers at the front and rear ends thereof. These sustaining elements 11 comprise blades 12 which are hingedly connected to rotor bodies or hubs 13 which revolve around substantially vertical axis. When the helicopter is resting upon the ground and the sustaining elements are stationary, the blades 12 droop or slope downwardly and outwardly as shown in full lines in Fig. 1.

When the sustaining elements 11 are in rotation, centrifugal action, acting in the blades 12 will cause them to rise from the drooping positions in which they are shown in full lines, and when the pitch of the blades is increased from zero value, the lifting action of the air on the blades will cause them to swing upwardly, for example to position such as indicated by the dotted lines 12′. The positioning of the blades is a variable function of static weight, centrifugal force and lift. During direct vertical rise or hovering the angles of all the blades may be the same, but when the aircraft is maneuvering, that is moving horizontally, the blades will rise as they pass through one portion of their revolution around the vertical axis and droop as they pass through the opposite side of their revolution, this being referred to as a flapping action in view of the fact that as a wing moves around the center of rotation defined by the hub 13 it likewise has an up and down movement.

Figure 2:
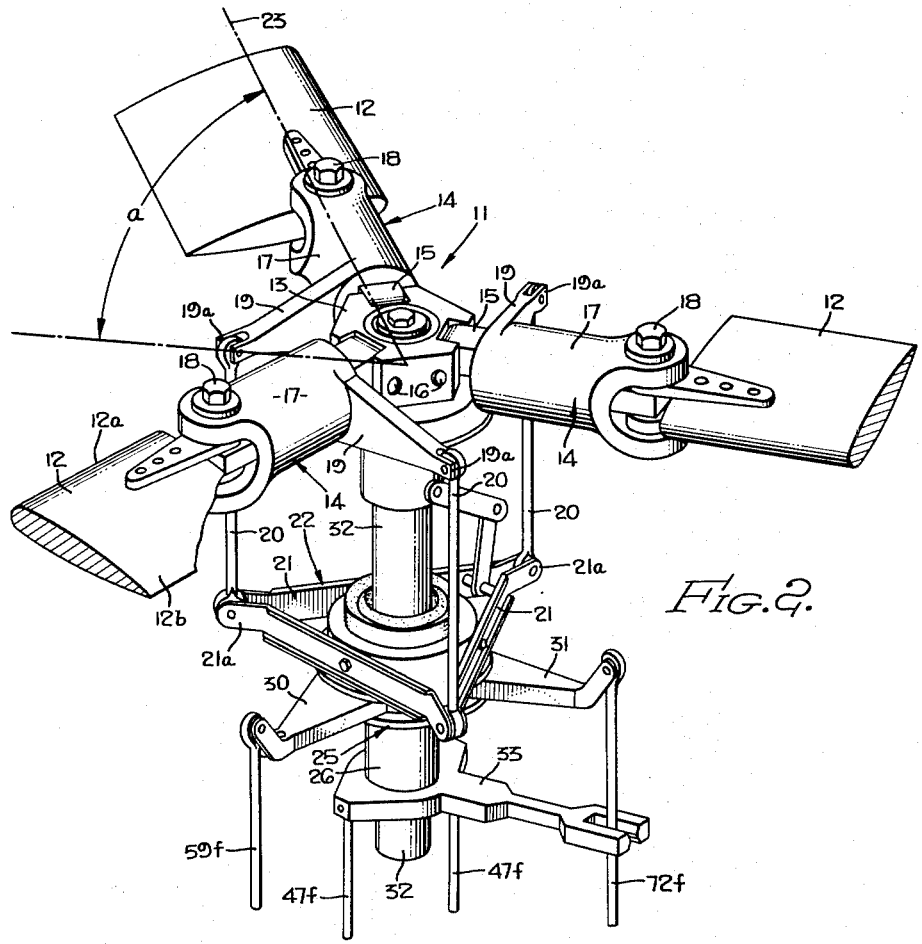
Fig. 2 is a schematic perspective view showing the upper end of the forward rotatable shaft of the helicopter shown in Fig. 1, the sustaining blades and the means for varying the pitch of these sustaining blades.

In Fig. 2 are schematically shown the front (leftward) sustaining element of the helicopter disclosed in Fig. 1 and the blade pitch controlling elements directly associated therewith. There are three blades 12 which are connected to the rotor body 13 by universal connections 14. Each of these connections 14 consist of a pin 15 connected by hinge 16 with the rotor body 13 so that the pin may swing in a vertical plane. A cylindric shell 17 which rotates on the pin 15 as disclosed in detail in my copending application, Serial No. 249,679, now U. S. Patent No. 2,672,941, enables rotation of the blade 12 for pitch adjustment. A vertical hinge pin 18 connects the outer end of the shell 17 with the inner end of the blade 12 so that the blade 12 may have a substantially horizontal swinging movement. A lever arm 19 projects rearwardly from the shell 17. This lever is spaced outwardly a short distance from the associated hinge 16.

The outer end of each lever arm 19 is connected by a vertically extending link 20 with a radiating part 21 of a spider 22. The spider 22 is shown as a ring and each of the radiating portions 21 thereof is in the form of a lever or arm. In Fig. 2 I have shown an angle *a* indicating the angular distance the outer end 19*a* of each lever arm 19 lags behind the axis 23 of the blade 12 with which it is associated. The outer end 21*a* of each arm 21 of the spider 22 lies substantially directly below the outer end 19*a* of a lever 19. Therefore, the outer end 21*a* of each arm 21 lags behind the axis 23 of the blade 12 with which it is associated an angular distance *a*.

As shown in Fig. 3 the spider 22 comprises a metal ring supported so that it will rotate around its axis by bearings 24 which are mounted on a swash plate 25 which is concentric to the spider 22 but, instead of having rotation around its axis, has a limited wobbling or tilting movement around a point *p* located on the axis of the rings 22 and 25. The swash plate 25 is mounted on a sleeve 26 by ball and socket means 27 comprising inner and outer rings 28 and 29 having engaging faces 29*a* forming part of a sphere generated around the point *p*. As shown in Fig. 2, the spider 22 has three projecting arms 21 disposed at angles 120°, but the swash plate 25 has only two arms 30 and 31 disposed at angles of 90° separation arranged to be swung up and down in correlated manner so as to tilt the axis of the swash plate 25 in any direction around the point *p*. The axis of the spider 22 always coincides with the axis of the ring 25; therefore, the plane in which the spider 22 is rotatable is determined by the position in which the swash plate 25 is held by control movement imparted to the arms 30 and 31. For example, if the arm 31, Fig. 2, is raised and lowered, while the arm 30 is held horizontal, the spider 22 will be tilted forwardly and rearwardly. If the arm 30 is moved vertically while the arm 31 is held stationary the spider 22 will be tilted laterally. Combined vertical movements of the arms 30 and 31 will cause diagonal tilting of the spider 22.

The sleeve 26 surrounds the hollow shaft 32 which is fixed at its upper end to the rotor body 13 and provides a means for supporting and rotating the sustaining element 11. The sleeve 26 is non-rotatable and therefore the vertical shaft 32 rotates within it. The sleeve 26 has a transverse plate 33 on its lower portion and struts or links 47*f* extend downwardly from the plate 33. Vertical movement of the links 47*f* produces vertical movement of the sleeve 26 and also of the spider 22 which is mounted thereon as previously described. The raising and lowering of the sleeve 26 as the result of movement imparted through the links 47*f* results in a like vertical movement of the outer ends of the arms 21 and of the links 20. This is referred to as "collective" movement and produces collective pitch adjustment of the blades 12. Links 59*f* and 72*f* extend substantially vertically downwardly from the outer ends of the arms 30 and 31, respectively, for imparting vertical movement to the arms 30 and 31 so as to tilt the spider 22 for "cyclic" adjustment of the pitch of the rotor blades 12.

As shown in Fig. 2 each lever 19 extends rearwardly with respect to the wing axis 23; therefore, downward swinging movement of a lever 19 will raise the leading edge 12*a* of a wing and lower the following or trailing edge 12*b* thereof, thereby imparting pitch to the blade 12 or increasing the existing pitch. Also, if the outer end 19*a* of a lever 19 is held stationary and the associated blade 12 is swung upwardly, the inner end of the lever 19 will be raised slightly, causing a change in the angular position of the lever 19 and therefore an increase in the pitch of the associated blade 12. In other words, swinging of a lever 19 in a vertical plane, whether it is caused by vertical movement of the outer end 19*a* of the lever or relative vertical movement of the inner end of the lever 19 will cause rotation of the cylindric sleeve portion of the blade connecting means 14, this resulting in a change in the pitch of the blade.

The two foregoing ways of varying the pitch of a blade, that is to say either by swinging the outer end of its associated lever 19 up and down or by swinging the blade up and down, enters into the control of the sustaining means 11. For example, let it be assumed that the sustaining means is rotating under idling conditions with the blades at zero pitch, centrifugal force acting in the blades will cause them to rise from the drooping positions in which they are shown in Fig. 1. Then if movement is imparted through the links 47*f* to lower the sleeve 26, Figs. 2 and 3, a short distance, all of the levers 19 will be swung downwardly a short angular distance and a small pitch will be imparted to the blades 12, increasing their lift characteristics so that the blades will swing upwardly. This upward swinging of the blades 12 will very slightly increase the angular positions of the levers 19 relative to horizontal, thereby producing a further slight increase in the pitch of the blades so as to increase the lift of the blades.

As indicated in Fig. 1, a collective lift control lever 34, duplicate upright levers 37 and pedals 49 are provided in operative relation to a pilot's chair C within the forward portion of the helicopter body 10. If there are two chairs in side by side relation, the lever 34 may be placed between the chairs so that the occupants of both chairs may raise and lower the lever 34. Likewise the levers 37 are shown in duplicate for dual control purposes. Also, the pair of pedals 49 may be duplicated for dual control of the shaft.

The control means involving the levers 37 includes a horizontal transverse bar 46 having tubes 48 secured to the ends thereof in crossing relation. These tubes 48 are also secured to the upper ends of levers the lower ends of which are supported by hinge members 63 arranged on an axis parallel to and below the bar 46, thereby providing a forward and rearward swinging movement of the bar 46 around the axis of the hinge means 63. The tubes 48 at the ends of the bar 46 provides bearings for the lower ends 37a of the levers 37 and enabling a lateral swinging movement of the levers as indicated by the arrows 72. The levers 37 may be swung forwardly and rearwardly in unison around the axis defined by the hinges 63, this swinging movement involving a like forward and rearward swinging movement of the arms 62 and the bar 46. Levers 74, fixed on the lower ends of the levers 37 project downward in parallel relation and are connected by a jointed link 75 which has a flexible joint 75' intermediate its ends, for a purpose which will be later described, effects a like lateral swinging movement of the levers 37. Lugs 76 project downward from an intermediate portion of the bar 46. When the levers 37 are swung forwardly and rearwardly as indicated by arrows 73, the lugs 76 will likewise move forwardly and rearwardly.

The front collective control links 47f of Fig. 2 are also shown in Fig. 4. The lower ends thereof are connected to a crank assembly 43f of bell crank character. It consists of levers 77 which project forwardly from a tubular member 78 supported for rotation on a transverse shaft element 79. Arms 80 and 80' project respectively downwardly and upwardly from the tubular member 78.

The rear sustaining element 11 of the helicopter the same as the front sustaining element shown in Fig. 2 and the pitch control means therefore is the same as that shown in Fig. 2 except that the cyclic control arm 31 extends forwardly instead of rearwardly as shown in Fig. 4. Collective pitch control links 47r, which are counterparts of the links 47f have their upper ends connected to the pitch control means for the rear rotor of the aircraft. Vertical movement transmitted through the links 47r will be transmitted through the plate 33 and the sleeve 26 of the rear control means to vertically shift the rear swash plate 25 and collectively add to or detract from the pitch of all the rear rotor blades without changing the relative cyclic pitches of those blades. The lower ends of the links 47r are connected to a rear crank assembly 43r which is the same as the front crank assembly 43f, except that the levers 77 thereof, which are connected to the lower ends of the links 47r, extend rearwardly instead of forwardly.

The vertically swingable collective lift control lever 34 is connected through a link 34a with a centrally pivoted mixing lever. The mixing lever 35 has a sprocket 36 at its center which rotates on the substantially vertical axis of rotation of the lever 35. End sprockets 39 are mounted on the ends of the mixing lever 35 so as to rotate on axes parallel to the axis of rotation of the sprocket 36, and intermediate sprockets 40 are disposed on the mixing lever 35 between the central sprocket 36 and the end sprockets 39 and so as to rotate on axes which are parallel to the axis of the sprocket 36. The central sprocket 36 is operatively connected to the lever 37 by means of a linkage 38 which has its parts so arranged that as the levers 37 are moved forwardly and rearwardly the sprocket 36 will be caused to rotate respectively clockwise and counterclockwise. A chain 41 extends over the sprockets 36 and 39 and the ends of the chain 41 are connected through cables 42 and 42' with the levers 80 and 80', to effect rotation of the crank means 43f. A chain 44 extends over the sprockets 40 and under the sprocket 36 and has its ends connected by cables 45 and 45' respectively with the downwardly and upwardly extending levers 80 and 80' of the rear crank means 43r. Swinging of the mixing lever 35 by vertical operation of the lever 34 will cause collective or similar movements of the cables 42—45 and 42'—45'. That is to say if the lever 34 is lifted, the mixing lever 35 will be rotated in counterclockwise direction, exerting a pull on both cables 42 and 45, since the sprocket 36, being at this time stationary, prevents movement of the chains 41 and 44 lengthwise of the mixing lever 35. This pull on the cable 42 and 45, accompanied by a similar releasing movement of the cables 42' and 45' will effect a downward rotation of the levers 77 of the front and rear crank means 43f and 43r, which will in turn lower the links 47f and 47r to effect collective increase in the pitch of the blades of both the front and rear rotors. Lowering of the collective lift control lever 34 will rotate the mixing lever 35 in clockwise direction, exerting a pull in the cables 42' and 45' so that the levers 77 of the front and rear crank means 43f and 43r will be swung upwardly, thereby effecting a collective decrease in the pitch of the blades of both the front and rear rotors. Differential lift control is accomplished by forward and rearward movement of the control levers 37. When the levers 37 are swung forwardly, the central sprocket 36 will be rotated in clockwise direction. This will effect a rightward movement of the chain 41 and a leftward movement of the chain 44. The rightward movement of the chain 41 will exert a pull on the cable 42' and the leftward movement of the chain 44 will exert a pull on the cable 45 with the result that the links 47f will be raised and the links 47r will be lowered, thereby effecting a collective decrease in the pitch of the blades for the front rotor and a collective increase in the pitch of the blade for the rear rotor. When the control levers 37 are moved rearwardly, there will be a reversal of the movements of the cables described in the foregoing so that there will be a collective increase in the pitch of the blades of the front rotor and a collective decrease in the pitch of the blades of the rear rotor. Accordingly, the control lever 34 effects a simultaneous change in the lifting effect of both front and rear rotors whereas the forward and rearward movement of the levers 37 accomplishes a differential change in the lifting effect of the front and rear rotors for the purpose of front and rear leveling of the craft. The linkage 38 is shown as a lever 81 fixed to the sprocket 36 and projecting forwardly therefrom, a bell crank 82 and links 82' and 83' arranged to connect the opposite ends of the bell crank 38 respectively to the lever 81 and the lugs 76.

For directional control, that is to say turning to the right or to the left, foot pedals 49a and 49b are operatively connected to a mixing arm 50 by means of linkage 51. The mixing arm 50 is centrally pivoted so as to swing on a substantially vertical axis and has a central sprocket 52 mounted thereon so as to rotate on the pivot axis of the mixing arm 50. This mixing arm 50 has end sprockets 54 and intermediate sprockets 55 which are mounted on the mixing arm so as to rotate on substantially vertical axes. A chain 56 runs over the sprockets 52 and 54 and has its opposite ends connected by self compensating means 83 with a centrally functioned lateral cyclic control arm 59r associated with the control for the rear rotor. A chain 60 runs over the two intermediate sprockets 55 and under the central sprocket 52 and has its ends connected by cable 61 and 61' through a compensating means 83 with the centrally fulcrumed lateral cyclic control lever 59f associated with the control for the front rotor. By reason of the crossing of the cables 61 and 61', as shown in Fig. 5, differential cyclic lateral adjustment of the blades of the front and rear rotors is accomplished by the swinging of the mixing arm 50 around its pivot axis. If the linkage 51 moves the mixing arm 50 in clockwise direction, pull will be applied to the cables 57' and 61' with the result that the link 59r will be moved downwardly and the link 59f will be moved upwardly. Counterclockwise rotation of the mixing arm 50 will result in the pull being exerted through the cables 57 and 61, with the result that opposite differential cyclic adjustment of the front and rear rotor blades will occur. This will result from transmission of upward movement through the link 59r through the swash plate arm 30 associated with the rear rotor control means, and transmission through the lateral cyclic pitch control link 59f movement to the lateral arm 30 of the control means associated with the front rotor.

Lateral control of the front and rear rotor by simultaneous raising or lowering of the lateral control levers 30 is accomplished by swinging the levers 37 laterally as indicated by arrows 72. This swinging movement of the levers 37 is transmitted through the levers 74 to the link 75, and the flexible joint 75' substantially in the middle of the link 75 is connected to the front end of a lever which extends forwardly from and is fixed to the sprocket 52, thereby causing movement of the chains 56 and 60 in opposite directions. The flexible joint 75', intermediate the ends of the link 75, permits the ends of the link to swing up and down as the levers 37 are swung forwardly and rearwardly, as indicated by the arrows 73. Referring to Fig. 5, rightward movement of the handles 37 will result in leftward movement of the chain 56 and rightward movement of the chain 60 whereby a pull will be applied by these chains to the cables 57 and 61' to effect a simultaneous raising of the front-rotor and rear-rotor lateral pitch control links 59f and 59r. Likewise, leftward swinging movement of the levers 37 will result in rightward and leftward movements respectively of the chains 56 and 60 so that a pull will be exerted in the cables 57' and 61 effecting a simultaneous downward movement of the links 59f and 59r.

The sprocket 52 is of compound nature. It is in effect a pair of half sprockets 52a and 52b joined so that they rotate as a unit around the axle pin 50a on which the mixing lever 50 swings. The sprocket portion 52a is larger in radius than the sprocket portion 52b and these portions 52a and 52b respectively mesh with the chains 56 and 60. Accordingly, when the lever 53 is swung as the result of lateral manipulation of the lever 37, greater movement will be imparted to the chain 56 and cables 57 and 57' than will be imparted to the chain 60 and the cables 61 and 61'. Therefore, the fulcrum lever 84r will be swung through a greater angle than the fulcrum lever 84f, although in the same direction, and the inclination of the coning axis of the rear rotor will be greater than the inclination of the coning axis of the forward rotor with the result that a greater lateral force will be exerted by the rear rotor to compensate for the increased resistance of the tail section to lateral movement as compared to the resistance of the forward part of the fuselage to lateral movement, and a lateral shifting of the fuselage will be accomplished without material rotation thereof around a vertical axis.

So as to produce longitudinal movement of the helicopter with a minimum of yawing, the control means schematically shown in Fig. 6 is provided. Herein the control lever 37 is connected with the front and rear longitudinal pitch control links 72f and 72r by means of links 64, 66, 68 and 69 and bell cranks 65, 67, 70f and 70r. The links 72f and 72r are respectively connected to the longitudinal pitch arms 31 of the front and rear rotor controls. Forward movement of the levers 37 applies tension to the link 64, and through the linkage shown the links 72f and 72r are respectively moved upwardly and downwardly. A reverse movement of the links 72f and 72r occurs when the levers 37 are moved rearwardly. A feature of this control is that when the lever 37 is pushed forwardly so as to adjust the controls for forward flight, the bell cranks 67, 70f and 70r are proportioned so that the forward rotor will have greater forward pull than the rear rotor. Similarly the proportioning of the bell cranks 67, 70f and 70r is such that when the levers 37 are swung rearwardly so as to accomplish rearward flight adjustment of the rotors, the rear rotor will have a greater force component in rearward direction than will the front rotor.

In order that the collective adjustment vertically of the swash plate will not disturb whatever cyclic adjustments have been made through the cyclic adjustment links 72 and 59, means are provided for raising and lowering the levers 70 and 84 as the swash plate supporting sleeve 26 is raised and lowered by the crank assembly 43. This is accomplished as shown in Fig. 7 by providing around the shaft 32 and below the sleeve 26 a sleeve 85 which is connected by radially extending pins 86 with the lower ends of the collective pitch adjustment links 47. This sleeve 85, therefore, will move up and down as the links 47 are moved up and down.

As further shown in Fig. 7 the horizontal pivot means 79 for the crank means 43 is mounted on the upper end of a short post 87 which is secured to and extends upwardly from the upper portion of a gear case 88 from which the shaft 32 upwardly extends. The levers 77 of the crank means 43 are connected to the lower ends of the links 47 and to the pins 86 by short links 89. As the lever 80' of the crank means 43 is rotated in clockwise direction the upward movement of the levers 77 will cause simultaneous upward movement of the links 47 and of the sleeve 85. On the upper portion of the sleeve 85 there is a pivot pin 90 to which the upper end of the bell crank means or lever 70 is connected. The link 68, by which the lever 70 is actuated extends substantially horizontally. Therefore, when the sleeve 85 is lifted as a part of the operation of collective pitch adjustment, upward movement of the pivot pin 90 which is mounted on the sleeve 85 will produce a like upward movement of the lever 70 so that the lower end of the cyclic adjustment link 72 will have a vertical movement similar to the vertical movement of the sleeves 26 and 85, without change in the cyclic pitch adjustment which has been established through a previous adjustment of the lever 70 and the link 72. The fulcrum lever 84 of the self compensating mechanism 83 is swung on a horizontal pin 91 which projects from the lower portion of the sleeve 85, Fig. 7. The lever 84 has an open space in the center thereof and in this space a pair of sprockets 92 are disposed on the pin 91 so as to rotate freely. Near the ends of the arm or lever 84 outer sprockets 93 of the same diameter as the sprockets 92 are mounted on horizontally directed pins 94. Chains 95 and 96 have their upper ends connected to a stationary part of the fuselage structure. Referring to Fig. 8, one of these chains 95 extends downwardly and then leftwardly under one of the sprockets 92. From the lower part of this sprocket 92 the chain 95 extends over the top of the sprocket 93' and then downwardly to a clamp 97' by which it is connected to the cable 61', Fig. 5. The chain 96 extends downwardly in parallel relation to the chain 95 and then rightwardly under the other of the sprockets 92 and then over the top of the sprocket 93 and downwardly to a clamp 98' by which it is connected to the upper end of the cables 61. The fulcrum lever 84 is caused to swing on the pin 91 by relative movement of the cables 61 and 61' transmitted to the ends of the chains 95 and 96. It is characteristic of the operation of the control that when the cable 61 is moved in one direction, the cable 61' will be moved the same amount in the opposite direction; therefore, this movement of the cables 61 and 61' may be employed to rotate the fulcrum lever 84 and vertically move the lateral cyclic pitch control rod 59. However, the pin 91 moves vertically as the sleeve 85 is moved and the lever 84 is shifted vertically without changing its angular position. For example, if the sleeve 85 is raised, the upward movement of the pin 91 will carry the central sprockets 92 upwardly and a lifting force will be applied through the lever 84 to the sprockets 93 and 93', tending to lift the same. However, since the downwardly depending portions of the chains 95 and 96 are held stationary by the cables 61 and 61', there will be in effect an upward rolling movement of the sprockets 92, 93 and 93' along the chains 95 and 96 without change in the angular position of the lever 84 and, therefore, without changing the relationship of the lower end of the link 59 to the sleeve 85.

A feature of the invention is that in the operation of the controls shown in Fig. 5 to accomplish either lateral or direction control, the angular movement of the fulcrum lever 84r associated with the control for the rear rotor will always be at a greater rate than the angular movement of the fulcrum lever 84f associated with the front rotor. Therefore in turning the craft either to the right or to the left, the rotation will be around a vertical reference axis situated near the front of the fuselage and extending near to or through the seat portion of the chair C. Likewise in lateral movement of the craft, the additional lateral force exerted by the rear rotor as compared to the front rotor will compensate for the additional drag resulting from the flat lateral area presented by the tail section of the fuselage 10. This makes it possible by swinging the levers 37 laterally to effect a lateral movement of the craft with substantially no rotation of the craft around a vertical reference axis.

The linkage 51 comprises a link 97, a fulcrum lever 98 and links 99 and 100. The fulcrum lever is pivoted intermediate its ends on a vertical axis $v$ and includes a vertically elongated plate 101 at the end thereof. The link 99 connects the upper end of the plate 101 with the upwardly extending arm 102a of the pedal 49a and the link 100 connects the lower end of the plate 101 with a downwardly extending lever 103 which is secured to the horizontal tube 104 arranged to support the pedal 49b. The end of the fulcrum lever 98 opposite from the plate 101 is connected by the link 97 with the mixing lever 50. When the pedal 49a is pushed forwardly so as to be caused to rock in counterclockwise direction, the pull of the link 99 exerted on the plate 101 will rotate the fulcrum lever 98 in clockwise direction and the motion of the far end of the lever 98 will be transmitted by the link 97 to the mixing lever 50, causing the same to rotate in clockwise direction. Concurrently with the foregoing, the leftward shifting of the plate 101 will transmit leftward movement through the link 100 to the lever 103 causing the pedal 49b to swing in clockwise direction, or in other words in a direction opposite to that which was imparted to the pedal 49a. Consequently, if the lever 49b is pushed forwardly, the lever 49a will move rearwardly. The motion of the plate 101 will be counterclockwise with relation to the axis $v$ and the motion transmitted from the far end of the fulcrum lever 98 through the link 97 to the mixing lever 50 will be counterclockwise, causing an adjustment of the links 59f and 59r opposite to the adjustment thereof effected by forward movement of the pedal 49a. The invention also includes means for simultaneously adjusting the pedals 49a and 49b toward and away from the pilot's chair in accordance with pilot's leg length. This adjusting means is not shown in the schematic view of Fig. 5, but is shown in the fragmentary detail Fig. 9 wherein I have shown the end of the fulcrum bar 98 and one of the plates 101, namely the plate at the near end of the fulcrum lever 98. Referring to Fig. 9, this plate 101 is supported so that it will have limited rotation around the axis of the fulcrum lever 98. It is mounted on a sleeve 105, and this sleeve 105 is disposed in telescoping relation to a portion of the fulcrum lever 98 and is turnable thereon. An arm 106 is fixed on the sleeve 105 downwardly and forwardly projecting positions. A manually operable lever 107 is connected to the end of the arm 106 by a hinge pin 108. Adjacent the arm 106 there is a notched plate segment 109 which is fixed on the fulcrum lever 98 so that it cannot rotate around the axis of the lever 98. A tension spring 110 has its upper end connected to a lug 111 which projects from the upper portion of the segment 109, and the lower end of this spring 110 is connected to a lug 112 which projects from the lever 107. The spring 110 is positioned so that its tensile force not only tends to swing the lever 107 toward the periphery of the segment 109, but also tends to rotate the arm 106 and the sleeve 105 in counterclockwise direction. The lever 107 has a projection 113 adapted to engage any of the notches 114 in the segment 109, thereby providing an interengagement which will prevent rotation of the plate 101. The projection 113 is in the central notch 114 and the plate 101 is held in vertical position on the end of the shaft 98. The pilot may adjust the pedals 49b and 49a away or toward the pilot's chair by manually swinging the lever 107 in clockwise direction, and then shifting it upward or downward into the notch above or the notch below the central notch 114. For example, if the projection 113 is shifted to the upper notch 114, the plate 101 will be rotated in counterclockwise direction to bring its vertical axis into the position indicated by the dotted line 115. This rotation of the plate 101 will shift the link 99 leftwardly and the link 100 rightwardly, rotating both levers 102a and 102b in counterclockwise direction thereby simultaneously shifting the pedals 49a and 49b into the positions thereof indicated by the numeral 49a' and 49b'. When the plate 101 is shifted horizontally as the result of rotation of the fulcrum lever 98 around its axis, the pedals 49a and 49b will be shifted on opposite directions, but rotation of the plate 101 either clockwise or counterclockwise will produce a shifting of the pedals simultaneously either forwardly or rearwardly.

In Fig. 10 I have shown an alternative form of mixing lever which may be substituted for either of the levers 35 or 50 of Figs. 4 and 5. Assuming that the mixing lever of Fig. 4 is to be replaced, I have shown in Fig. 10 a mixing lever 35a arranged to be swung on a centrally disposed hinge member 116. A lever 81a, corresponding to the lever 81 of Fig. 4, also swings on the hinge member 116, but independently of the fulcrum lever 35a which is imparted a limited swinging movement by the link 34a, actuated by the handle 34. On the ends of the fulcrum lever 35a there are sprockets 117 and 118 to which levers 119 and 120 are fixed, these levers being connected to the lever 81a by links 121 and 122 so that swinging of the lever 81a as the result of forward or rearward movement of the lever 37 will result in the swinging of the levers 119 and 120 and a rotation of the sprockets 117 and 118. Chains 123 and 124 are run over the sprockets 117 and 118 as shown. These chains are adapted to be connected to control cables such as shown in Figs. 4 and 5. If the mixing lever 35a is swung on the hinge member 116, while the lever 81a is maintained stationary, the sprockets 117 and 118 will be merely shifted horizontally without rotation on their respective axis and the chains 123 and 124 will have the ends thereof shifted simultaneously. But, should the lever 81a be swung, the sprocket 117 and 118 will be rotated and the ends of the chains 123 and 124 will be moved differentially instead of collectively.

I claim:

1. In a control for an aircraft having a front sustaining rotor and a rear sustaining rotor, each having blades which are adjustable in pitch: a control member arranged so as to be moved by a pilot for forward movement of the aircraft; front and rear linkage means connecting said control member with said front and rear rotors for cyclic pitch adjustment of said blades so that each of said rotors will have a forward force component, said front linkage means having parts proportioned with relation to the parts of said rear linkage means so that said front linkage means will effect in said front rotor a greater forward force component than is effected in said rear rotor by said rear linkage means, in response to movement of said control member for forward movement of the aircraft; and means to effect collective pitch adjustment of the blades of said rotors.

2. In a control for an aircraft having a front sustaining rotor and a rear sustaining rotor, each having blades which are adjustable in pitch: a control member arranged so as to be moved by a pilot in one direction from a mid-position for forward movement of the aircraft and in another direction from said mid-position for rearward movement of the aircraft; front and rear linkage means connecting said control member with said front and rear rotors for cyclic pitch adjustment of said blades so that each of said rotors will have a forward force component, said front linkage means having parts proportioned with relation to the parts of said rear linkage means so that said front linkage means will effect in said front rotor a greater forward force component than is effected in said rear rotor by said rear linkage means, in response to movement of said control member for forward movement of the aircraft, and said rear linkage means having parts proportioned with relation to the parts of said front linkage means so that said rear linkage means will effect in said rear rotor a greater rearward force component than is effected in said front rotor by said front linkage means in response to movement of said control member for rearward movement of the aircraft; and means to effect collective pitch adjustment of the blades of said rotors.

3. In a control for an aircraft having a front sustaining rotor and rear sustaining rotor, each having blades which are adjustable in pitch: a control member arranged so as to be moved by a pilot for rearward movement of the aircraft; front and rear linkage means connecting said control member with said front and rear rotors for cyclic pitch adjustment of said blades so that each of said rotors will have a forward force component, said rear linkage means having parts proportioned with relation to the parts of said front linkage means so that said rear linkage means will effect in said rear rotor a greater rearward force component than is effected in said front rotor by said front linkage means in response to movement of said control member for rearward movement of the aircraft; and means to effect collective pitch adjustment of the blades of said rotors.

4. In a control for an aircraft having a front sustaining rotor and a rear sustaining rotor, each having blades which are adjustable in pitch: a control member arranged so as to be moved by a pilot on opposite sides of an intermediate position for lateral movement of the aircraft; front and rear linkage means connecting said control member with said front and rear rotors for cyclic pitch adjustment of said blades so that each of said rotors will have a sideward force component, said rear linkage means having parts so proportioned with relation to the parts of said front linkage means that said rear linkage means will effect in said rear rotor a greater lateral force component than is effected in said front rotor by said front linkage means in response to movement of said control member for lateral movement of the aircraft; and means to effect collective pitch adjustment of the blades of said rotors.

5. In a control for an aircraft having a front sustaining rotor and a rear sustaining rotor, each having blades which are adjustable in pitch: a first control member arranged so as to be moved by a pilot for lateral movement of at least one end of the aircraft; front and rear linkage means connecting said control member with said front and rear rotors for cyclic pitch adjustment of said blades so that each of said rotors will have a sideward force component, one of said linkage means having parts so proportioned with relation to the parts of the other of said linkage means that one of said linkage means will effect in the corresponding rotor a greater lateral force component than is effected in the remaining rotor by said other of said linkage means in response to movement of said control member for lateral movement of the aircraft; a second control member arranged so as to be moved for forward movement of the aircraft; first and second linkage means connecting said second control member with said front and rear rotors for cyclic pitch adjustment of said blades so that each of said rotors will have a forward force component, said front linkage means having therein a lever connected so as to be moved forwardly by said second control member from an initial position, said lever being arranged so that its effective lever arm increases as the lever moves forwardly from said initial position, so that said first linkage means will effect in said front rotor a greater force component than is effected in said rear rotor by said second linkage means, in response to movement of said second control member for forward movement of the aircraft; and means to effect collective pitch adjustment of the blades of said rotors.

6. In a control for an aircraft having a front sustaining rotor and a rear sustaining rotor, each having blades which are adjustable in pitch: a longitudinal control member arranged so as to be moved by a pilot for longitudinal movement of the aircraft; a lateral control member arranged so as to be moved by the pilot for lateral movement of the aircraft; front and rear linkage means connecting said longitudinal control member with said front and rear rotors for cyclic pitch adjustment of said blades so that each of said rotors will have a forward force component, said front linkage means having parts proportioned with relation to the parts of said rear linkage means so that said front linkage means will effect in said front rotor a greater forward force component than is effected in said rear rotor by said rear linkage means, when said front and rear linkage means are moved in response to movement of said longitudinal control member for forward movement of the aircraft; first and second linkage means connecting said lateral control member respectively with said front and rear rotor for lateral cyclic control of the rotor blades, said second linkage means having parts so proportioned with relation to the parts of said first linkage means that said second linkage means will effect in said rear rotor a greater lateral force component than is effected in said front rotor by said first linkage means in response to the movement of said lateral control member for lateral movement of the aircraft; and means to effect collective pitch adjustment of the blades of said rotors.

7. In a control for an aircraft having a front sustaining rotor and a rear sustaining rotor, each having blades which are adjustable in pitch: a longitudinal control member arranged so as to be moved by a pilot for longitudinal movement of the aircraft; a turn control member arranged so as to be moved by the pilot for turning movement of the aircraft; front and rear linkage means connecting said longitudinal control member with said front and rear rotors for cyclic pitch adjustment of said blades so that each of said rotors will have a forward force component, said front linkage means having parts proportioned with relation to the parts of said rear linkage means so that said front linkage means will effect in said front rotor a greater forward force component than is effected in said rear rotor by said rear linkage means, when said front and rear linkage means are moved in response to movement of said longitudinal control member for forward movement of the aircraft; first and second linkage means connecting said turn control member with said front and rear rotor for lateral cyclic control of the rotor blades in opposite directions, said second linkage means having parts so proportioned with relation to the parts of said first linkage means that said second linkage means will effect in said rear rotor a greater lateral force component than is effected in said front rotor by said first linkage means in response to the movement of said turn control member for turning movement of the aircraft; and means to effect collective pitch adjustment of the blades of said rotors.

8. In a control for an aircraft having a front sustaining rotor and a rear sustaining rotor, each having blades which are adjustable in pitch: a turn control member arranged so as to be moved by the pilot for turning movement of the aircraft; first and second linkage means connecting said turn control member with said front and rear rotor for lateral cyclic control of the rotor blades in opposite directions, said second linkage means having parts so proportioned with relation to the parts of said first linkage means that said second linkage means will effect in said rear rotor a greater lateral force component than is effected in said front rotor by said first linkage means in response to the movement of said turn control member for turning movement of the aircraft; and means to effect collective pitch adjustment of the blades of said rotors.

9. In control means for an aircraft having a front sustaining rotor and a rear sustaining rotor, said rotors having blades which are adjustable in pitch; linkage means for effecting lateral pitch adjustment of the blades of at least one of said rotors; right and left foot pedals for actuating said linkage means, said pedals being arranged in side by side position; hinge means supporting said pedals for back and forth swinging movement; a fulcrum lever having one end thereof connected to said linkage means so as to actuate said linkage means when said lever is swung; an arm extending from one of said pedals downwardly from said hinge means; a link connecting the other end of said fulcrum lever with said downwardly extending arm of one of said pedals; and a link connecting said other end of said fulcrum lever with the other of said pedals at a point above said hinge means.

10. A combination as defined in claim 9 having an adjustment member supported on said other end of said fulcrum lever so as to be adjustable around the axis of said fulcrum lever, and means for connecting said links respectively to the lower and upper portions of said adjustment member, so that rotation of said adjustment member around said axis of said fulcrum lever will swing said pedals simultaneously and in the same direction on said hinge means for the purpose of adjusting the pedals toward or away from the pilot.

11. In control means for an aircraft having at least one sustaining rotor equipped with blades adjustable in pitch: linkage means for effecting lateral pitch adjustment of the blades of said rotor; right and left foot pedals for actuating said linkage means, said pedals being arranged in side by side position; hinge means supporting said pedals for back and forth swing movement; a fulcrum lever having one end thereof connected to said linkage means so as to actuate said linkage means when said lever is swung; an arm extending from one of said pedals downwardly from said hinge means; a link connecting the other end of said fulcrum lever with said downwardly extending arm of one of said pedals; and a link connecting said other end of said fulcrum lever with the other of said pedals at a point above said hinge means.

12. Control means in an adjustable pedal arrangement for control means; hinge means; levers extending in opposite direction from said hinge means and being swingable thereon; pedals disposed in side by side relation and on one side of said hinge means and being connected to said levers for swinging them back and forth on said hinge means; a linkage member which is to be moved by the swinging of said levers by said pedals; an adjustable body supported on said linkage member so as to rotate around an axis substantially parallel to the axis of said hinge means, said body having oppositely extending arms; links connecting said levers respectively to said oppositely extending arms; and means for adjusting said body in rotation on said linkage member whereby said links will be moved in opposite directions and said pedals will be moved in the same direction.

13. In cyclic pitch control means for tandem sustaining rotors of an aircraft: control linkage means connected to said rotors, said control linkage means having a pair of flexible members arranged in side by side relation; a mixing lever means including a fulcrum lever swingable on pivot means intermediate its ends, a center rotary member, outer rotary members on the opposite ends of said lever and intermediate rotary members on said lever spaced inwardly from said outer rotary members, one of said flexible members being connected to said outer rotary members and to one side of said center rotary member, and the other of said flexible members being connected to said intermediate rotary members and the other side of said center rotary member, whereby swinging of said fulcrum lever will effect like movement of said flexible members and rotation of said center rotary member will effect differential movement of said flexible members; and means for rotating said center rotary member.

14. A control means as defined in claim 13 wherein said center rotary member is characterized by eccentricity so that said center rotary member, when rotated, will impart greater movement to one of said flexible members than to the other.

15. In cyclic pitch control means for tandem sustaining rotors of an aircraft: control linkage means connected to said rotors, said control linkage means having a pair of flexible members arranged in side by side relation; a mixing lever means including a fulcrum lever swingable on pivot means intermediate its ends, rotary members on said fulcrum lever to which said flexible members are respectively connected so that swinging of said fulcrum lever will effect collective movement of said flexible members; and means for rotating said rotary members to effect differential movement of said flexible members.

16. In pitch control means for tandem sustaining rotors of an aircraft: collective control linkage means extending from said rotors and within the aircraft; a mixing lever means connected to said linkage means, said mixing lever means comprising a fulcrum lever connected to said linkage means for simultaneous collective adjusting movement of said linkage means, and a differential lever member for differential collective adjusting movement of said linkage means; a horizontally arranged pilot's lever connected to said fulcrum lever so as to be operative to swing the same; and a vertically arranged pilot's lever connected to said differential lever member so that forward and rearward movement of said vertically arranged pilot's lever will swing said differential lever member.

17. In pitch control means for tandem sustaining rotors of an aircraft: collective control linkage means extending from said rotors and within the aircraft; a mixing lever means connected to said linkage means, said mixing lever means comprising a fulcrum lever connected to said linkage means for simultaneous collective adjusting movement of said linkage means, and a differential lever member for differential collective adjusting movement of said linkage means; a horizontally arranged pilot's lever connected to said fulcrum lever so as to be operative to swing the same; a vertically arranged pilot's lever connected to said differential lever member so that forward and rearward movement of said vertically arranged pilot's lever will swing said differential lever member; cyclic control linkage means extending from said rotors and within the aircraft; cyclic mixing lever means connected to said cyclic control linkage means, said cyclic mixing levers means having a first connection with said cyclic control linkage means for like movement of said cyclic control linkage means to effect lateral pitch adjustment of both of said rotors, and a second connection with said cyclic control linkage means to effect turning cyclic pitch adjustment of said rotors; foot pedals for operation by the pilot; a linkage for transmitting lateral movement of said vertically arranged pilot's lever to said first connection so that said rotors will be adjusted in a manner to cause lateral movement of the aircraft; and a linkage for transmitting movement from said pedals to said second connection so that said rotors will be adjusted in a manner to accomplish turning of said aircraft about a vertical axis.

18. In control means for an aircraft sustaining rotor having blade structures supported for variable pitch adjustment; levers extending from the inner ends of said blade structure; an upright shaft for turning the rotor; a vertically movable sleeve around said shaft below said rotor; a swash plate mounted on said sleeve so as to have a tilting movement around a center point located within said shaft; a spider mounted on said plate so as to rotate around said center point, said spider having link connectors disposed in a transverse plane which passes through said center points; links connecting said levers of said blade structures with said connectors of said spider; link connectors disposed angularly on said swash plate and in said transverse plane whereby links may be connected to said swash plate to tilt said swash plate and said spider so as to effect cyclic pitch adjustment of said blade structures; and means for vertically moving said sleeve so as to effect collective pitch adjustment of said blade structures.

19. In a control for an aircraft having a front sustaining rotor and a rear sustaining rotor, each having blades which are adjustable in pitch; a control member arranged so as to be moved by a pilot for forward movement of the aircraft; front and rear linkage means connecting said control member with said front and rear rotors for cyclic pitch adjustment of said blades so that each of said rotors will have a forward force component, said front linkage means having therein a lever connected so as to be moved forwardly by said control member from an initial position, a pivot supporting said lever in a position wherein its effective lever arm increases as the lever moves forwardly from said initial position, so that said front linkage means will effect in said front rotor a greater forward force component than is effected in said rear rotor by said rear linkage means, in response to movement of said control member for forward movement of the aircraft; and means to effect collective pitch adjustment of the blades of said rotors.

20. In a control for an aircraft having a front sustaining rotor and a rear sustaining rotor, each having blades which are adjustable in pitch: a control member arranged so as to be moved by a pilot arranged to be moved in one direction from a mid-position for forward movement of the aircraft and in another direction from said mid-position for rearward movement of the aircraft; front and rear linkage means connecting said control member with said front and rear rotors for cyclic pitch adjustment of said blades so that each of said rotors will have a forward force component, said front linkage means having parts proportioned with relation to the parts of said rear linkage means so that said front linkage means will effect in said front rotor a greater forward force component than is effected in said rear rotor by said rear linkage means, in response to movement of said control member for forward movement of the aircraft, and said rear linkage means having parts proportioned with relation to the parts of said front linkage means so that said rear linkage means will effect in said rear rotor a greater rearward force component than is effected in said front rotor by said front linkage means in response to movement of said control member for rearward movement of the aircraft, said front linkage means having therein a lever connected so as to be moved forwardly and rearwardly by said control member from a central position, a pivot supporting said lever in a position whereing its effective lever arm increases as the lever moves forwardly and decreases as it moves rearwardly, and said rear linkage means having therein a lever connected so as to be moved forwardly and rearwardly by said control member from a central position, a pivot supporting said last named lever in a position wherein its effective lever arm decreases as it moves forwardly and increases as it moves rearwardly; and means to effect collective pitch adjustment of the blades of said rotors.

21. In a control for an aircraft having a front sustaining rotor and a rear sustaining rotor, each having blades which are adjustable in pitch; a control member arranged so as to be moved by a pilot for rearward movement of the aircraft; front and rear linkage means connecting said control member with said front and rear rotors for cyclic pitch adjustment of said blades so that each of said rotors will have a forward force component, said rear linkage means having therein a lever connected so as to be moved forwardly and rearwardly by said control member, a pivot supporting said lever in a position wherein its effective lever arm increases as the lever is moved rearwardly from an initial position so that said rear linkage means will effect in said rear rotor a greater rearward force component than is effected in said front rotor by said front linkage means in response to movement of said control member for rearward movement of the aircraft; and means to effect collective pitch adjustment of the blades of said rotors.

22. In a control for an aicraft having a front sustaining rotor and a rear sustaining rotor, each having blades which are adjustable in pitch: a control member arranged so as to be moved by a pilot on opposite sides of an intermediate position for lateral movement of the aircraft; front and rear linkage means connecting said control member with said front and rear rotors for cyclic pitch adjustment of said blades so that each of said rotors will have a sideward force component, said front and rear linkage means each having a fulcrum lever therein, the leverage proportion of the fulcrum lever in said rear linkage means being greater than the leverage proportion of the fulcrum lever of said front linkage means, to accomplish a greater rate of lateral cyclic pitch variation in said rear rotor than in said front rotor, so that said rear linkage means will effect in said rear rotor a greater lateral force component than is effected in said front rotor by said front linkage means in response to movement of said control member for lateral movement of the aircraft; and means to effect collective pitch adjustment of the blades of said rotors.

23. In a control for an aircraft having a front sustaining rotor and a rear sustaining rotor, each having blades which are adjustable in pitch; a longitudinal control member arranged so as to be moved by a pilot for longitudinal movement of the aircraft; a lateral control member arranged so as to be moved by the pilot for lateral movement of the aircraft; front and rear linkage means connecting said longitudinal control member with said front and rear rotors for cyclic pitch adjustment of said blades so that each of said rotors will have a forward force component, said front and rear linkage means each having a fulcrum lever therein, a pivot supporting said front fulcrum lever so that its forwardly acting leverage proportion is greater than the forwardly acting leverage proportion of the fulcrum lever in said rear linkage means, to accomplish a greater rate of forward cyclic pitch variation in said front rotor than in said rear rotor so that said front linkage means will effect in said front rotor a greater forward force component than is effected in said rear rotor by said rear linkage means, when said front and rear linkage means are moved in response to movement of said longitudinal control member for forward movement of the aircraft; first and second linkage means connecting said lateral control member respectively with said front and rear rotor for lateral cyclic control of the rotor blades, said second linkage means having parts so proportioned with relation to the parts of said first linkage means that said second linkage means will effect in said rear rotor a greater lateral force component than is effected in said front rotor by said first linkage means in response to the movement of said lateral control member for lateral movement of the aircraft; and means to effect collective pitch adjustment of the blades of said rotors.

24. In a control for an aircraft having a front sustaining rotor and a rear sustaining rotor, each having blades which are adjustable in pitch: a longitudinal control member arranged so as to be moved by a pilot for longitudinal movement of the aircraft; a lateral control member arranged so as to be moved by the pilot for lateral movement of the aircraft; front and rear linkage means connecting said longitudinal control member with said front and rear rotors for cyclic pitch adjustment of said blades so that each of said rotors will have a forward force component, said front linkage means having parts proportioned with relation to the parts of said rear linkage means so that said front linkage means will effect in said front rotor a greater forward force component than is effected in said rear rotor by said rear linkage means, when said front and rear linkage means are moved in response to movement of said longitudinal control member for forward movement of the aircraft; first and second linkage means connecting said lateral control member respectively with said front and rear rotor for lateral cyclic control of the rotor blades, said first and second linkage means each having a fulcrum lever therein, the leverage proportion of the fulcrum lever in said second linkage means being greater than the leverage proportion of the fulcrum lever in said first linkage means, to accomplish a greater rate of lateral cyclic pitch variation in said rear rotor than in said front rotor, so that said second linkage means will effect in said rear rotor a greater lateral force component than is effected in said front rotor by said first linkage means in response to the movement of said lateral control member for lateral movement of the aircraft; and means to effect collective pitch adjustment of the blades of said rotors.

25. In a control for an aircraft having a front sustaining rotor and a rear sustaining rotor, each having blades which are adjustable in pitch: a longitudinal control member arranged so as to be moved by a pilot for longitudinal movement of the aircraft; a lateral control member arranged so as to be moved by the pilot for lateral movement of the aircraft; front and rear linkage means connecting said longitudinal control member with said front and rear rotors for cyclic pitch adjustment of said blades so that each of said rotors will have a forward force component, said front and rear linkage means each having a fulcrum lever therein, a pivot supporting said front fulcrum lever so that its forwardly acting leverage proportion is greater than the forwardly acting leverage proportion of the fulcrum lever in said rear linkage means, to accomplish a greater rate of forward cyclic pitch variation in said front rotor than in said rear rotor so that said front linkage means will effect in said front rotor a greater forward force component than is effected in said rear rotor by said rear linkage means, when said front and rear linkage means are moved in response to movement of said longitudinal control member for forward movement of the aircraft; first and second linkage means connecting said lateral control member respectively with said front and rear rotor for lateral cyclic control of the rotor blades, said first and second linkage means each having a fulcrum lever therein, the leverage proportion of the fulcrum lever in said second linkage means being greater than the leverage proportion of the fulcrum lever in said first linkage means, to accomplish a greater rate of lateral cyclic pitch variation in said rear rotor than in said front rotor, so that said second linkage means will effect in said rear rotor a greater lateral force component than is effected in said front rotor by said first linkage means in response to the movement of said lateral control member for lateral movement of the aircraft; and means to effect collective pitch adjustment of the blades of said rotors.

26. In a control for an aircraft having a front sustaining rotor and a rear sustaining rotor, each having blades which are adjustable in pitch: a longitudinal control member arranged so as to be moved by a pilot for longitudinal movement of the aircraft; a turn control member arranged so as to be moved by the pilot for turning movement of the aircraft; front and rear linkage means connecting said longitudinal control member with said front and rear rotors for cyclic pitch adjustment of said blades so that each of said rotors will have a forward force component, said front and rear linkage means each having a fulcrum lever therein, a pivot supporting said front fulcrum lever so that its forwardly acting leverage proportion is greater than the forwardly acting leverage proportion of the fulcrum lever in said rear linkage means, to accomplish a greater rate of forward cyclic pitch variation in said front rotor than in said rear rotor so that said front linkage means will effect in said front rotor a greater forward force component than is effected in said rear rotor by said rear linkage means, when said front and rear linkage means are moved in response to movement of said longitudinal control member for forward movement of the aircraft; first and second linkage means connecting said turn control member with said front and rear rotor for lateral cyclic control of the rotor blades in opposite directions, said first and second linkage means each having a fulcrum lever therein, the leverage proportion of the fulcrum lever in said second linkage means being greater than the leverage proportion of the fulcrum lever in said first linkage means, to accomplish a greater rate of lateral cyclic pitch variation in said rear rotor than in said front rotor, so that said second linkage means will effect in said rear rotor a greater lateral force component than is effected in said front rotor by said first linkage means in response to the movement of said turn control member for turning movement of the aircraft; and means to effect collective pitch adjustment of the blades of said rotors.

27. In a control for an aircraft having a front sustaining rotor and a rear sustaining rotor, each having blades which are adjustable in pitch: a turn control member arranged so as to be moved by the pilot for turning movement of the aircraft; first and second linkage means connecting said turn control member with said front and rear rotor for lateral cyclic control of the rotor blades in opposite directions, said first and second linkage means each having a fulcrum lever therein, the leverage proportion of the fulcrum lever in said second linkage means being greater than the leverage proportion of the fulcrum lever in said first linkage means, to accomplish a greater rate of lateral cyclic pitch variation in said rear rotor than in said front rotor, so that said second linkage means will effect in said rear rotor a greater lateral force component than is effected in said front rotor by said first linkage means in response to the movement of said turn control member for turning movement of the aircraft; and means to effect collective pitch adjustment of the blades of said rotors.

28. An aircraft control as defined in claim 20 having also a turn control member arranged so as to be moved by the pilot for turning movement of the aircraft; first and second linkage means connecting said turn control member with said front and rear rotor for lateral cyclic control of the rotor blades in opposite directions, said first and second linkage means having a fulcrum lever therein, the leverage proportion of the fulcrum lever in said second linkage means being greater than the leverage proportion of the fulcrum lever in said first linkage means, to accomplish a greater rate of lateral cyclic pitch variation in said rear rotor than in said front rotor, so that said second linkage means will effect in said rear rotor a greater lateral force component than is effected in said front rotor by said first linkage means in response to the movement of said turn control member for turning movement of the aircraft.

References Cited in the file of this patent

UNITED STATES PATENTS

| Number | Name | Date |
| --- | --- | --- |
| 1,749,471 | Bothezat | Mar. 4, 1930 |
| 2,318,260 | Sikorsky | May 4, 1943 |
| 2,496,624 | Heintze | Feb. 7, 1950 |
| 2,532,483 | Daland | Dec. 5, 1950 |
| 2,555,577 | Daland | June 5, 1951 |

FOREIGN PATENTS

| Number | Country | Date |
| --- | --- | --- |
| 655,832 | Great Britain | Aug. 1, 1951 |